United States Patent [19]
Von Hollen

[11] Patent Number: 5,318,082
[45] Date of Patent: Jun. 7, 1994

[54] UNIVERSAL JOINTER

[76] Inventor: Henry J. Von Hollen, 3633 Cal-Ken Dr., Murrysville, Pa. 15668

[21] Appl. No.: 944,104

[22] Filed: Sep. 11, 1992

[51] Int. Cl.$^5$ ............................ B27F 1/00; B27C 5/10
[52] U.S. Cl. ........................................ 144/84; 33/197; 144/85; 144/144.8; 144/144.5 R; 409/130
[58] Field of Search ................ 144/84, 85, 87, 134 D, 144/136 C, 144 R, 144.5, 372; 409/130, 182; 33/197

[56] References Cited

U.S. PATENT DOCUMENTS

| | | | |
|---|---|---|---|
| 4,168,730 | 9/1979 | Keller | 144/144.5 |
| 4,815,215 | 3/1989 | Saylor et al. | 144/144.5 |
| 5,139,062 | 8/1992 | Keller | 144/144.5 |

Primary Examiner—W. Donald Bray

[57] ABSTRACT

This invention relates to a jointer which can be accurately positioned and firmly held to the mating members of a workpiece. The jointer, when used in conjunction with a series of removable templates, will properly guide a hand held router utilizing a variety of bits to cut the matching edges of the workpieces. The jointer can be positioned to cut matching joint configurations either across, or parallel to, the edge of the workpiece which when joined form, a variety of completed and matching joints. The joints which can be fabricated include, but are not limited to the following: through-dovetail joints of different configuration sizes, box joints, through-dovetail joints where the board thickness is greater than the bit cutting length, half blind through dovetail joints, in plane dovetail joints, sliding dovetail joints, mortice and tenon. The jointer includes accurate indexing means formed therein cooperating with the templates for precisely defining the relative positions of each segment of the joints to be fabricated in the workpiece.

7 Claims, 4 Drawing Sheets

FIG. 8F
PRIOR ART under ing the device can as well be applied to a smaller structure and/or router table/table saw application.

UNIVERSAL JOINTER

This invention is directed generally to a jointer to facilitate the cutting of one or more complex joints in workpieces and is particularly directed to a jointer having removable templates and indexing means which cooperate to accurately locate the joints in the workpiece relative to the templates.

BACKGROUND OF THE INVENTION

The amateur or professional cabinet maker is faced with the decision of how best to join separate pieces of wood when designing and building various pieces of furniture and or structures. The joints may be such that the edges of the adjoining boards meet at right angles and the face planes of the boards are perpendicular, such as a drawer or chest. The edges may also be parallel to each other with the two board members in the same plane, such as the face frame of a cabinet. The selection of the joint ultimately used becomes one of considering the required strength, appearance and size of the structure and the capabilities of the individual cabinet maker.

There are a large variety of such joints all of which are ordinarily glued and do not use mechanical fasteners, i.e. screws or nails. To increase the strength of the joint, various configurations are cut either parallel to or across the edge of the boards to be joined. The joint configuration may separately or in combination utilize the following principles:

1. Increase the surface area for glueing. The most simple example is a mitered joint where the edges are cut at 45 degrees and the surface area is increased by 41%. The strength of this joint is solely dependent on the glue characteristics.

2. Utilize concealed supports within the joint such as dowels, splines, biscuits, or a mortice and tenon as shown in FIG. 8D, which provide additional glueing surface area and some additional strength from the concealed supports.

3. The surface area for glueing is increased and the mechanical configuration of the joint provides further support for anticipated loads. The box joint, FIG. 8B, is an example of such a joint.

4. The joint is configured such that it can be assembled only in one direction. The loads on the structure in the perpendicular direction are carried by the wedging action of the wood making it a still stronger joint. Typical of such a joint are 1) the half blind dovetail joints commonly used to assemble drawers and 2) the through dovetail joint, FIG. 8A, which is most commonly used in building large chests.

Adding to the flexibility and diversity required of the jointer are the range of physical dimensions of the piece, the wood thickness, width and length of the member as well as the various configurations and sizes of bits which are available.

This invention describes a method and apparatus for forming the matching joints in materials such as wood. More particularly the configured templates can form a majority of the joints normally employed. It is especially useful for completing large structures which are too bulky to be set up on a table saw or on a router table. The jointer in this case is firmly fastened to the member(s) to be cut which in turn are held in position in a bench vice, etc. The principles disclosed for configuring the device can as well be applied to a smaller structure and/or router table/table saw application.

Figure 8A:
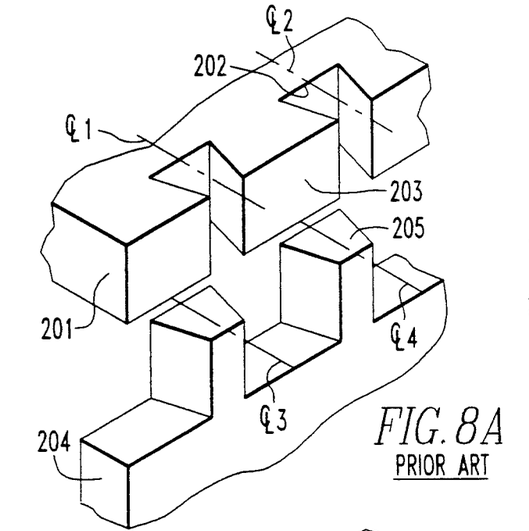
FIGS. 8A through 8F inclusive are illustrations of different joints and comprise prior art; they are included for illustration and clarity.
Figure 8B:
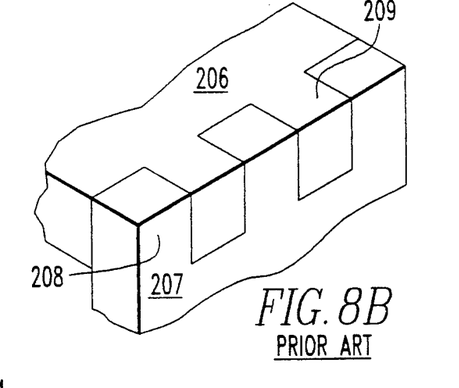

Two joints typical of the above discussed features are the box joint shown in FIG. 8B, and the through dovetail joint shown in FIG. 8A. In order to understand the functional requirements imposed on the jointer it is necessary to describe in more precise detail the geometry and symmetry of the joints. The box joint FIG. 8B can be best described as a regular pattern of identical square tooth cuts, the center lines of which are displaced on the joining members 206 and 207 by the width of a cut or tooth. The joint can be assembled through from either direction by inserting either member into the other. The uncut portions of both edges 208 and 209 are visible and hence it is a through joint. This joint requires only a straight router bit for completion.

The through dovetail joint of FIG. 8A has two very differently shaped edges, formed of a tail member 201 and pin member 204. On the tail member 201 a dovetail shaped cutout 202 is made perpendicular to and through the face of the member. The remaining section between the cuts is defined herein as a tail piece 203. On the pin member 204 the integral pins 205 are cut on the edge. When viewed from the ends the pins 205 have the exact shape of the dovetail cutouts 202 in the tail member 201.

This joint can only be assembled in one direction by inserting the pins 205 respectively into the dovetail cutouts 202. In the perpendicular direction the boards are restrained by the wedging action of the pins 202 in the dovetail cutouts 205. When glued this is an exceptionally strong joint and has been utilized by early craftsmen prior to the advent of power tools. This joint can be hand cut and is most attractive when assembled. Because of these features it is highly desirable to utilize a jointer together with a power tool to fashion the joint. Because of the seemingly irregular and complex shapes the jointer must complete a series of operations. Because of the joint geometry two different router bits, a dovetail and straight bit, must be used.

At first observation the through dovetail joint geometry shown in FIG. 8A seems complex. However, on closer examination it is readily understandable and can be translated into more specific geometric and mathematical forms as follows:

1. Material removed from one edge, whatever the shape, must be exactly reproduced at the corresponding location in the matching piece.

2. The corollary is also required, material left on one member must be matched by material removed on the matching piece.

3. The depth of cut in either piece must be equal to or slightly greater than the thickness of the matching piece. If the cut is less than the thickness the edge will not be flush with the face of the matching piece.

4. The centerlines CL 1 and CL2 of the dovetail cutout 202 in the tail member 201 must coincide exactly with the respective centerlines CL 3 and CL 4 of the pins 205 on the pin member 204.

5. The controlling dimensions of the dovetail router bit are the maximum diameter and the slope of the cut and these are the controlling dimensions of the cutouts 202. The dimension at the top of the cut is a function of the depth of the cut.

6. The maximum width of each pin 205 is therefore equal to the maximum diameter of the router bit and the sides of the pins 205 are each cut at an angle equal to the slope of the router bit.

The jointer 10 described in this invention can accomplish the above requirements. The jointer 10 can be positioned, i.e. indexed, relative to a reference edge on the particular workpiece, e.g. tail member 201 and pin member 204, and can accurately locate the centerline, of dovetail cuts and pin locations thereon. The jointer 10 can be firmly held at these positions and indexed to each workpiece and with a series of removable templates attached to the jointer 10 for making appropriate cuts, as will be described, one can accurately make the dovetail cuts and pin geometries. Correspondingly, the jointer can be used to remove the required material in a precise manner between the adjoining pin locations. Because of the flexibility and features incorporated in this invention it is possible to utilize a multiplicity of router bit sizes and shapes with the same or alternate templates. The use of removable templates with the jointer 10 permits a variety of shapes and hence a variety of matching joints to be fabricated.

There are currently two prior art devices to form through dovetail joints, the LEIGH and KELLER jigs which are identified respectively in U.S. Pat. Nos. 4,428,408 and 4,168,730. The LEIGH jig is a device where the templates for both the pin and tail cuts are formed by the front and back sections of a series of moveable guide fingers which when held in position then match the dovetail cut and pin centerlines and form the slope of the pin. Flexibility is provided as to the pin spacing but, because of the shape/slope of the templates, only one dovetail bit can be used. Because of the flexibility of the guide finger arrangement other joints can be made as long as the joint member is within the reach of the device. The KELLER jig can only be used for through dovetail joints and is simply two long metal templates accurately machined to make either half of one specific fixed joint i.e. pin spacing and bit configuration. The reach of both devices is limited to the overall length of the template or guide finger section. With both of these jigs a dovetail bit is used to make the tail member and a straight bit is used for the pin member.

The jointer described in this invention is based on a completely different principle. The cabinetmaker is able to accurately move, i.e. index, the jointer relative to the workpiece, such as members 201 and 204 of FIG. 8A, in reproducible, integral or incremental lengths. A short, removable template (s) is inserted in the jointer which establishes the cut(s) to be made and guides the hand held router. The accuracy is primarily established by the method used to position the jointer which can be positioned, i.e. indexed, in increments of different bit diameters. The flexibility to form different dovetail patterns is accomplished by the ability of the jointer to be accurately and reproducibly positioned on the workpieces. The removable templates permit a variety of shapes to be completed. The reach of the jointer is approximately twice its overall length. The dovetail bit is utilized to form the tail member and to remove the majority of the wastage between the pins which are then completed with a straight bit.

BRIEF DESCRIPTION OF THE DRAWINGS

The advantages, nature and additional features of the invention will become more apparent from the following description, which is to be taken in connection with the accompanying drawings. These drawings are incorporated in and constitute a part of this specification. They illustrate the separate parts which when assembled complete a typical preferred embodiment of this invention in which.

Figure 1:
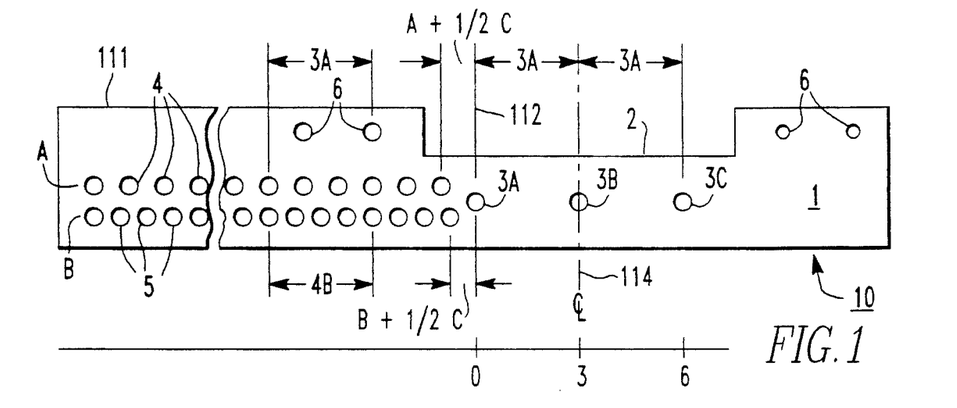
FIG. 1 is a plan view of the positioner which forms a part of the jointer of this invention

A more detailed description of each Figure and component of this invention follows:

FIG. 1 is a plan view of the positioner member 1 which forms a part of the jointer 10 of this invention. The positioner is a planar, rectangular section of uniform thickness having parallel faces and square edges. The top edge 111 has a rectangular cutout 2 which is offset from the centerline. The cutout is sufficiently deep that a cutting tool can pass through it. There are three reference holes, 3A, 3B and 3C, respectively, each of diameter "C", in the positioner 1 and located below the cutout 2 with the middle hole 3B centered on the centerline 114 of the cutout 2. The reference holes 3A and 3C, located respectively to the left and right of the center hole 3B are each spaced at a distance of 3A inches from the center; it will be understood that the distance A will be defined hereinafter. These holes are shown at positions 0, 3A, 6A in the positioner 1 of FIG. 1.

To the left of the 0 location on positioner 1 are two rows A and B of holes 4 and 5, respectively, drilled through the face of the section all of diameter C inches in rows parallel to long edge 111 thereof uniform but different spacings, of lengths A and B, respectively. The spacing on the top row of positioning holes 4 is A inches and on the bottom row of holes 5 is B inches. In this example, the ratio of lengths B/A equals $\frac{3}{4}$. Thus, the centerline of the third hole 4 from the right in the top row coincides with the centerline of the fourth hole 5 from the right in the second row.

The dimension between the "0" reference hole 3A and first hole 4 centerline in the A or top row is $A + \frac{1}{2}C$. Two rows of holes are shown; however, additional rows with different spacings could be added. They would follow the same principle as the A and B rows, that is, the holes in each individual line are located relative to each other such that the centerline of the Bth hole on the A line corresponds to the Ath hole on the B line where A and B are whole numbers. Thus, for example if A is 5 and B is 6, the centerline of the 5th hole in row A corresponds to the centerline of the 6th hole in row B.

There are, in this embodiment, four holes 6 drilled through the positioner 1 which are symmetrical about the centerline 114 of the cutout 2 and located adjacent the edge 111. These are used for rigidly attaching the positioner 1 to the auxiliary support 7, shown in FIG. 2. The cross section of the positioner 1 is sized to be sufficiently stiff so that when the positioner is clamped to a joint member or workpiece, it is of itself, or with backup, sufficient to straighten the normal cupping of the member.

Figure 2:
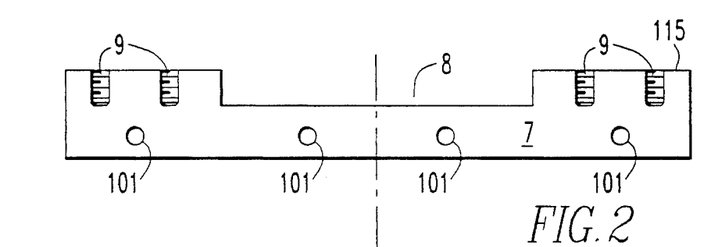
FIG. 2 is a plan view of the auxiliary support which may form another part of the jointer

FIG. 2 is a plan view of the auxiliary support 7. This piece is rectangular with square edges and parallel faces. It has a cutout 8 centered along one long edge and of the same width as the cutout 2 in the positioner 1. When assembled to the positioner the right side edges of positioner 1 and auxiliary support 7 will coincide and the cutouts 2 and 8 therein will also coincide. The auxiliary support 7 is installed perpendicular to the positioner 1 and can be installed on either side of the positioner 1. The drilled and tapped holes 9 formed in auxiliary support 7 and extending downwardly from the top edge 115 thereof are used for this purpose. and are aligned with holes 6 in positioner 1 to receive a suitable fastening means, not shown, each of which passes through each of at least two of the holes 6 in the positioner 1 and are threadedly received in holes 9 in the auxiliary support 7 in order to firmly affix the auxiliary support 7 to the bottom face of the horizontal base 11 (of FIG. 3A).

Figure 3A:
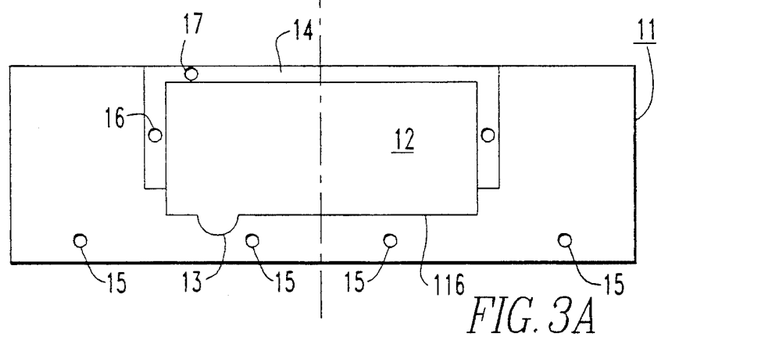
FIG. 3A is a plan view of the horizontal base which forms a part of the jointer

FIG. 3A is a plan view of the horizontal base 11. This is a rectangular member of uniform thickness and of the same length as the auxiliary support 7. There is a cutout 12 through the face of the horizontal base 11 centered on the length. The length of the cutouts 12, 8 and 2 in the horizontal base 11, the auxiliary support 7 and the positioner 1, respectively, are all equal. In the horizontal base 11, the cutout 12 is offset across the width, and a half circle 13 is cut to one side along the bottom edge 116 of the cutout 12. The width of the cutout 12 is established by the cutting length desired and the thickness of member to be cut, and as explained above, the length of cutout 12 equals that of cutouts 2 and 8.

The remaining three edges of the cutout 12 in the Horizontal Base 11 form a ledge 14 of a depth equal to half the thickness of the horizontal base 11. Two screw holes 16 are tapped into the ledge on either side of the cutout to fix templates of FIG. 5 in place relative to the horizontal base 11.

Four threaded holes 15 are formed in the horizontal base 15 to coincide with the four holes 101 in the Auxiliary Support 7 and are utilized to firmly attach and properly align these two components together. When assembled, the completed assembly is hereafter designated as the support base member and designated by the reference character 102.

The support base member 102 rests on the top edge 111 of the positioner 1 such that the two components are perpendicular to each other. The edge 115 of the auxiliary support abuts either face of the positioner 1, as desired. Provisions, such as fastening devices of conventional configuration (not shown), are made to firmly fasten the support base member 102 to the positioner 1 at the four symmetrical locations 6. When attached in this manner the cutouts 2, 8 and 12 in the components 1, 7 and 11 are aligned to each other.

Figure 3B:
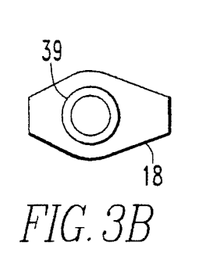
FIG. 3B is a plan view of the base stop employed with the jointer for indexing purposes

FIG. 3B is a plan view of the base stop 18 which has a chamfered hole 39 drilled through it for attachment in a suitable manner known in the art to the bottom side of the horizontal base 11 at a designated position 17 (FIG. 3A).

Stop 18 is of uniform thickness and has a cam like shape with a chamfered hole 39 thru it. The stop 18 can be rotated to the desired orientation when attached to the underside of the support base assembly 102.

Figure 4A:
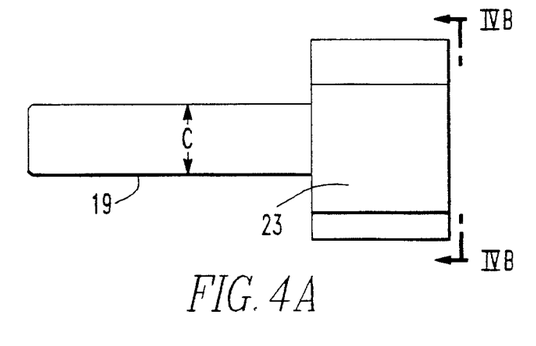
FIG. 4A is a view in side elevation of the positioner stop employed as a part of the jointer for indexing purposes.
Figure 4B:
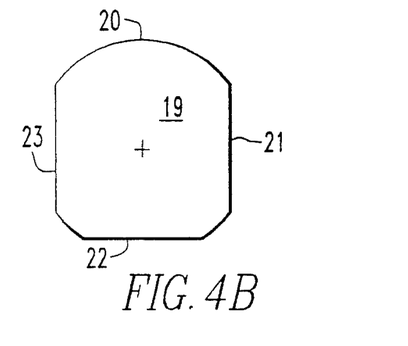
FIG. 4B is an end view of the positioner stop of FIG. 4A and taken along the lines IVB—IVB thereof.

FIG. 4A is a side elevational view and FIG. 4B is a top plan view of the positioner stop 19 having a head and a shaft portion which is a cylindrical section with two major concentric diameters. The shaft portion has a smaller diameter which is uniform and equal to the diameter "C" of the holes 4 and 5 drilled through the positioner 1 in rows A and B.

The larger diameter 20 of the head of positioner stop 19 is sized to be greater than the smaller diameter "C" by A inches and has flats machined on the remaining three cardinal axes of varying center to face dimensions 21, 22, 23.

The length of the smaller diameter section or shaft of positioner stop 19 is equal to the thickness of the positioner plus the maximum thickness of the member or workpiece to be cut. The length of the axis of the larger section in the direction of the shaft portion is equal to the member thickness.

The basic function of both stops 18 and 19 is to translate known positions on the jointer 10 directly to the workpiece or member in an accurate and completely reproducible fashion.

Figures 5A, 5K:
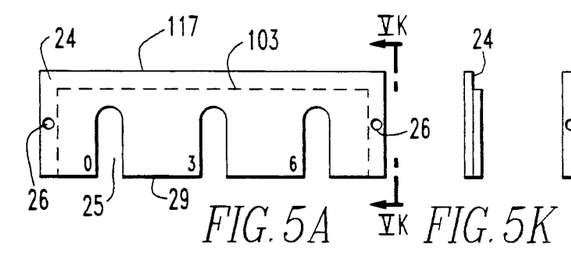
FIGS. 5A through 5J inclusive are respectively plan views of removable templates to form various joints and employed with the jointer of this invention.
FIG. 5K is an end view of the template of FIG. 5A and taken along the lines 5K—5K of FIG. 5A.
Figure 5B:
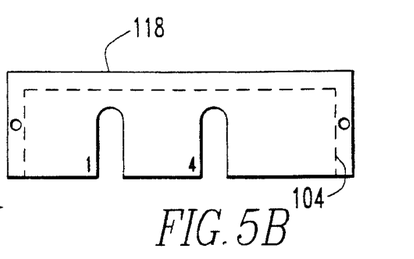

FIGS. 5A through 5J are face views of various templates 117 through 126, which are utilized with the horizontal base 11. All of the templates have a thickness which is equal to the thickness of the horizontal base 11. Similarly there is a support ledge 24 of ½ of the thickness around three edges of each template, i.e. extending along one long and both short edges. While ledge 24 (shown in FIG. 5K) is also shown in FIGS. 5A and 5B in phantom by the lines 103 and 104, it is understood that the templates of FIGS. 5C through 5J include such a ledge. Each template can be placed into and affixed to the assembled support base member 102 at the threaded holes 16 in the horizontal base 11 (FIGS. 3A and 6). When the template is installed in the support base they together form a completed stationary surface which is flat both top and bottom.

The remaining edge 29 of the templates 117 through 126 and the remaining edge 116 of the cutout 12 of the support base member 102 together form a guide path for the cutting tool such as for the shaft of the router bit 36 (FIG. 7) along the length of the cutout 12 to restrict the travel to the desired operations.

Slots such as slots 25 in the template of FIG. 5A are cut through the template from this guide path such that the cutting tool can then be guided through the cutout 2 in the face of the positioner 1 at a known location and at the desired angle or orientation to the edge or face plane of the member.

The width of the slots 25 matches standard guide bushings of the cutting tool manufacturers. The length of the slot allows free travel of the cutting tool completely through the maximum desired member or workpiece thickness.

A brief description of FIGS. 5A through 5J follows:

FIG. 5A Shows the universal straight/dovetail template 117 and in this embodiment has three guide slots perpendicular to the long edge of the template. The middle slot is centered on the template and the other two are a distance 3A from it. When installed in the completed assembly the center-lines of these slots will coincide with the references holes 3A, 3B and 3C (FIG. 1) at locations 0, 3, 6 in the positioner 1. The length of the template is the same as the width of the outer ledge dimension in the horizontal base assembly 11. The jointer 10 may be utilized effectively with only one slot location. In this example, a cutting length equal to the length 6A was utilized to minimize the number of positioner settings employed.

FIG. 5B is an auxiliary straight template 118 with slots at the 1 and 4 positions. With a spacing of 6A between Reference locations 0 and 6 there are seven equally spaced cutting positions each spaced "A" inches apart. Template 117 covers positions 0, 3, 6 with the jointer in a fixed position. If it is desired to cut locations 1, 2, 4, and 5 in this fixed position the auxiliary template 118 such as that shown in FIG. 5B can be used to cut positions 1 and 4. The template to cut positions 2 and 5 is identical to template 118 except that the ledge is cut in the opposite face, i.e., is a template that is the mirror image of template 118.

Figure 5C:
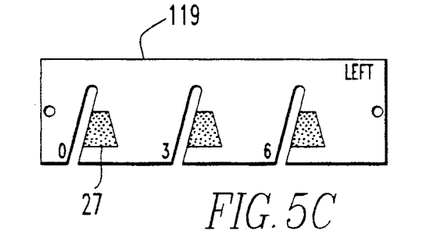
Figure 5D:
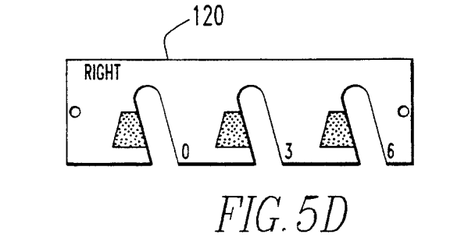
Figure 6:
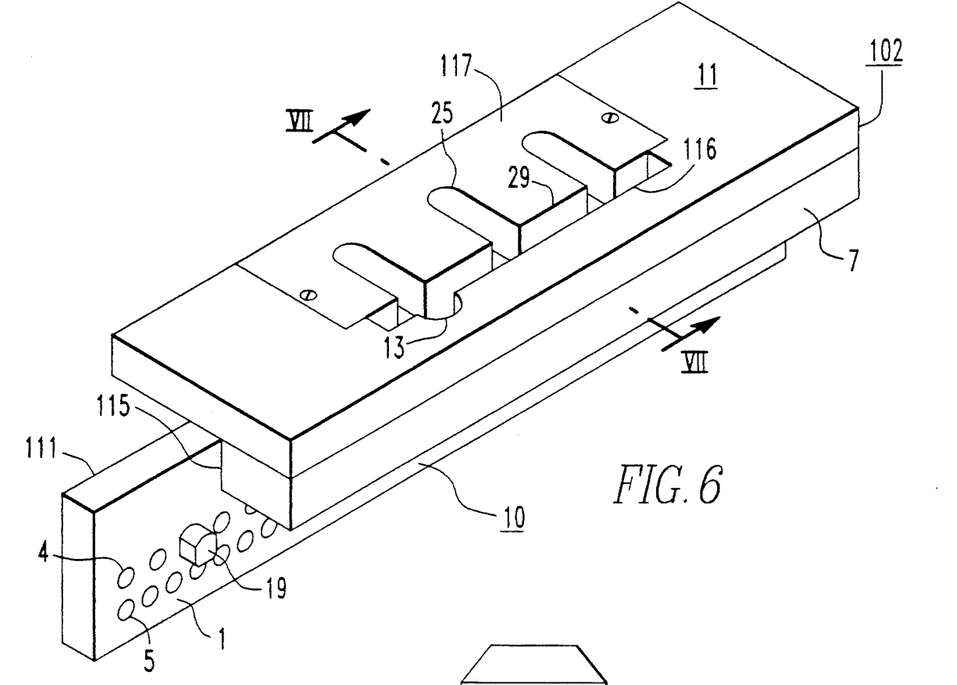
FIG. 6 is a perspective view of the present invention and shows a typical embodiment of the assembled universal jointer.

FIGS. 5C and 5D are the universal pin templates, (left side template 119 of FIG. 5C and right side template 120 of FIG. 5D). In these templates 119 and 120, the slots are positioned to cut either edge of the pin at locations 0, 3, 6. The pin shape 27 is outlined on the face of the templates as an operational aid.

Templates 117, 119, and 120 are termed universal templates as they can be utilized to fabricate thru dovetail joints utilizing either a dovetail bit with a maximum diameter of A inches or B inches. With the A inch diameter, the slots are at 0, 3, 6. With the B inch diameter, they are at 0, 4, 8.

Figure 5E:
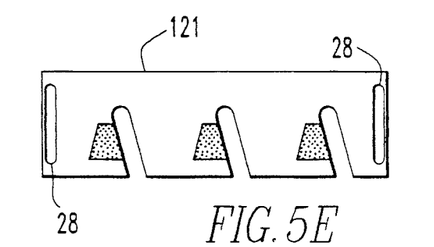
Figure 5F:
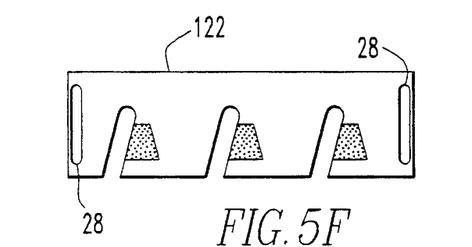

FIG. 5E and 5F show thick section templates 121 and 122, respectively, and are used to complete the dovetail pins in joint members or workpieces where the thickness of the workpiece is greater than the cutting length of the bit. The templates 121 and 122 are similar to templates 119 and 120 of FIGS. 5C and 5D except they are narrower and have a chamfered slot 28 for attachment to the support base assembly 102 instead of a hole for attachment. The templates 121, 122 can thereby be shifted in the cutout 12.

Figure 5G:
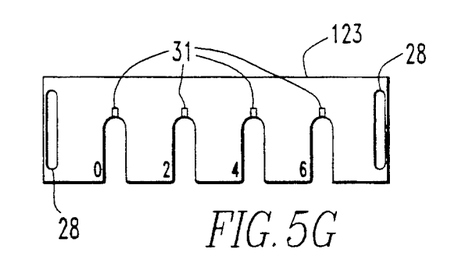
Figure 5H:
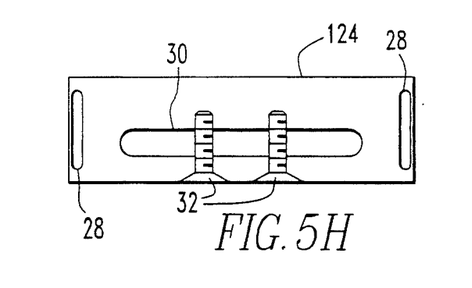

FIG. 5G and 5H show templates 123 and 124 which are employed to form a mortice and tenon joint. The slot configuration of template 123 will produce either 3 equal sized and spaced tenons, two asymmetric tenons or a single long tenon. Matching corresponding mortices can be completed with template 124.

These templates 123, 124 are also sized to be narrower and a chamfered slot 28 is also provided which will allow the template to be shifted within the cutout 12. Template 124 has a single slot 30 cut lengthwise along the template and thereby parallel to face of positioner 1. Two positions 32 are drilled horizontally through the template which divides the slot into three sections. These holes are tapped and screws can be inserted into them.

The tenon template 123 is similar in overall size to template 124 and similarly has a slot 28 for attachment. Template 123 has equally spaced slots cut perpendicular to the edge at positions 0, 2, 4, 6. The centerlines of 2 and 4 correspond to the centerline of the removable screws 32 which can divide the morticing slot.

Provisions are made to temporarily insert a plug into any of these slots to prevent that position from being cut. These plugs are not shown but can be described as having the shape of the slot, the same thickness as the template and having a means such as a fastener received in recesses 31 at the end of each stop to hold the plug in place.

Figure 5I:
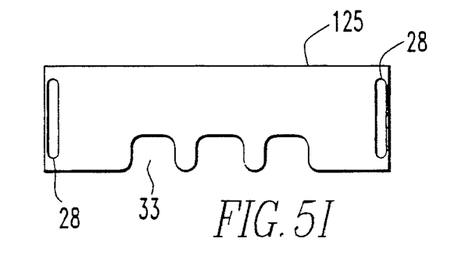
Figure 5J:
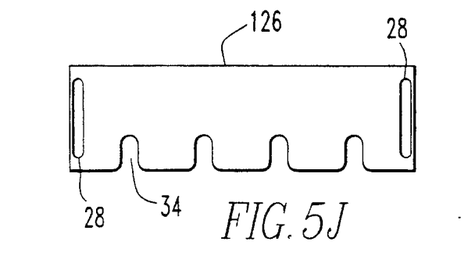

FIGS. 5I and 5J illustrate half blind dovetail templates 125 and 126 These templates when used in combination are utilized to fabricate matching half blind dovetail joints with a fixed spacing. Alternate spacings are possible with revisions in the slot dimensions and spacing.

FIG. 6 is a perspective view of the assembled and completed universal jointer 10. The support base member 102 is assembled from auxiliary support 7 and horizontal base 11 to the positioner 1. The bottom face of the horizontal base 11 is flat against the top edge 111 of the positioner 1 and at right angles to it. The auxiliary edge 115 of the support 7 is flush against the face of the positioner 1. The positioner stop 19 is shown inserted into one of the positioner locations 4 in Row A.

For illustrative purposes the universal dovetail template 117 of FIG. 5A is installed in the support base assembly 102. The innermost edge 29 of the template and innermost edge 116 of the cutout 12 form a complete guide path. The router bit can be installed thru the half circle 13 in the support base assembly 102. The cutting tool can then be moved to each successive slot location resting flat on the horizontal base member 102 and cutting only at the desired locations.

Figure 7:
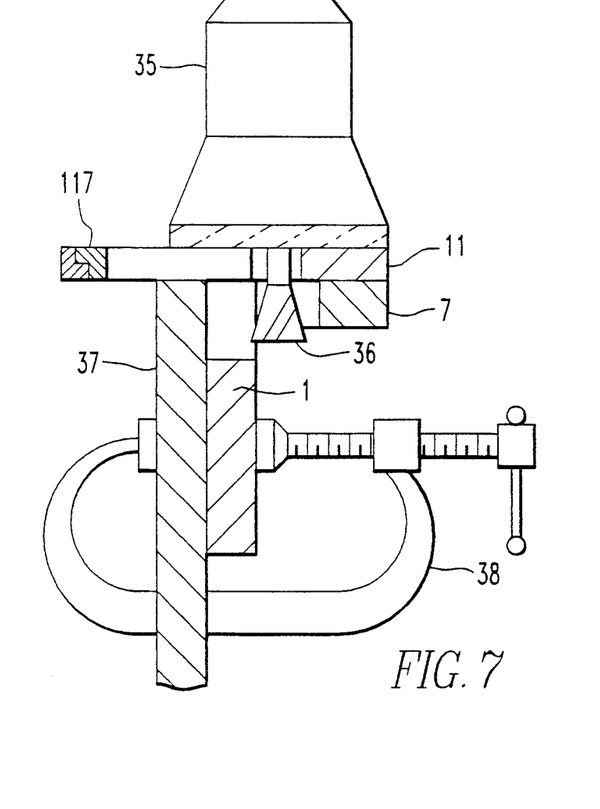
FIG. 7 is a cross section of the jointer of FIG. 6 and taken along the lines VII—VII thereof which is shown clamped to a workpiece and showing a hand held router in position relative to the jointer.

FIG. 7 is a cross section thru the assembly at one of the template slots. A router 35 of conventional design is shown on the support base member 102 with a dovetail bit 36 installed. A workpiece designated by the reference character 37 is positioned with its upper end flush against the bottom of the horizontal support 11 and its flat face against the vertical surface of positioner 1. Means such as a C-Clamp 38 is shown holding the jointer 10 assembly to the workpiece 37. The stop 19 is not shown.

FORMING THE JOINTS

The following discussion will describe the utilization of the jointer 10 to cut a variety of matching joint configurations of the type shown in FIGS. 8A through 8F. In each case, the cabinetmaker will have prepared the workpieces in which joints are to be formed in the usual fashion such that they are of proper size, true, and square, and are generally flat.

FORMING THROUGH DOVETAIL JOINTS—FIG. 8A

The cabinetmaker selects the dovetail bit for a router to be utilized and establishes the pattern he desires to cut in the matching edges.

For illustrative purposes a dovetail bit with a maximum diameter of A inches is selected with and utilizes the universal templates 117, 119 and 120 of FIGS. 5A, 5C and 5D, respectively.

In selecting the dovetail/pin pattern the cabinetmaker can select a regular, symmetrical or asymmetric pattern. Referring to FIG. 8A, the dovetail cutout 202 in the tail section 203 can be a single cut or multiple cuts. The dovetail cutout/pin locations are usually located at locations a distance of an integer times A inches from a reference edge. The pattern is established from a reference edge which is either the top or bottom edge of the completed structure and this edge is maintained as a fixed reference. The centerlines CL 1, CL 2, CL 3 and CL 4 of the dovetail cutouts/pin locations are each spaced at an integer multiple of the dimension but must be a distance of at least 2A inches apart.

The dovetail bit is utilized first to cut the tail sections 203. The dovetail bit is inserted in the router and centered within the installed guide bushing. The bit extends below the router base such that when the router is placed on the horizontal base 11 the cutting length protrudes a distance which is equal to or just slightly greater than the thickness of the wood. It is assumed for this illustration that all joint members have the same thickness, which thickness is less than the cutting length of the bit.

The joint member or workpiece 201 and/or 204 is held in an auxiliary support such as a bench vise so that the edge to be cut is generally level. The jointer 10 is assembled to the joint member, for example, workpiece 201 of FIG. 8A, as shown in FIG. 7. It may also be necessary to clamp a backing board (not shown) on the other face of the joint member 201. The backing board has two functions. Together with the positioner the resulting sandwich will have additional stiffness to flatten a cupped joint member and second, the sandwich will prevent tear out at certain locations as the router bit comes thru the wood. Cupping is not unusual in deep sections and proper fabrication and assembly depend on a flat section.

The positioner stop 19 is inserted in one of the openings 4 in the A row, for example, the "1" position, and held against the reference edge of the joint member. The three slot locations, 0, 3, and 6 in the universal dovetail template, 117, are now indexed at a distance 1A, 4A, and 7A, respectively, from the reference edge with the jointer 10 clamped properly in this position. If several or all of these locations had been selected for dovetail cutouts they could be cut at this time by traversing the desired slot.

There are seven possible locations, 0 thru 6, which could be selected in the 6A distance within the template 117 Had other locations been selected such as the 1, 3, 4, 5 locations with template 117, the jointer 10 could be moved relative to the workpiece 201, or the auxiliary template 118 could be utilized to cut at these locations with the jointer 10 remaining at the aforedescribed position. If the joint member is greater than 7A inches in width, the positioner stop 19 can be moved to a higher position and the device repositioned to make succeeding cuts. In this example, there are four tail members to be cut, two each on both ends of two of the opposite joint members.

The pin members 205 are completed on both edges of the two remaining members by first removing the bulk of the material between the pins. This material is at those centerline locations other than the dovetail cutout/pin locations. This material is removed using the dovetail bit and positioning the workpiece in the jointer 10 as above. Using the dovetail bit to remove the waste insures the same depth of cut and removes the maximum amount of material in each cut.

The pin 205 must be completed by cutting away the material remaining at the pin location to provide the proper slope and width of the pin. To do this a straight bit is inserted in the router and its depth is adjusted to provide the same depth of cut as previously.

The positioner stop locations are selected as before to locate the centerline of the pins. The appropriate pin template 119 or 120 is selected and inserted in the jointer 10 which is again properly positioned and clamped to the joint member, in this instance, workpiece 204 of FIG. 8A. The template to cut the one side of the pin is utilized followed by the corresponding template to cut the other side. All of the pins 205 on one edge of both joint members are completed in this fashion.

In order to index from the same reference edge, the jointer 10 is disassembled and the support base member 102 is attached to the opposite face of the positioner 1. The joint member in effect has left and right hand pins and this procedure of changing the location of the support base member 102 on the positioner 1 accomplishes the proper location of both left and right hand pins at the same indexed location relative to the same reference edge. The pins are cut in a similar manner using the same locations of the positioner stop 19 and the same reference edge.

The procedure is identical to the above if a dovetail bit with a maximum diameter of B inches is utilized. In this situation the B row positioner stop locations 5 are utilized. The same universal templates 117, 119, 120 can be used or the auxiliary templates with the B spacing between grooves may be substituted. The overall dovetail pattern, would, of course, be laid out based on the B spacing. The tail universal template 117 can be used as described above.

When the universal pin templates 119 and 120 are utilized with the B spacing the jointer must be shifted slightly to accommodate the smaller pin. This shift can be accomplished by using the appropriately sized end face 21, 22, or 23 of the stop 19 for positioning. Alternately, modified pin templates (not shown) of the s shown in FIGS. 5A through 5J may be utilized, but would be fabricated solely for the smaller pin dimensions.

FORMING BOX JOINTS—FIG. 8B

The box joint is the simplest thru joint. It is a series of regular square cuts where the width of the cut matches the width of the tooth. The depth of cut is equal to or slightly greater than the thickness of the wood. This joint is made using a straight router bit only. In this case the B spacing will be employed and the straight router bit must have a diameter equal to $\frac{1}{2}$B.

Every integral location on one of the matching edges of workpiece 206 must be cut and on the appropriate edge of the complementary workpiece 207 the cuts must be displaced by a distance equal to 1/2B. The universal dovetail templates 117 are used and the cuts made by attaching the device as described for the thru dovetail joints of FIG. 8A.

For one edge the positioner stop 19 with the diameter of C inches (FIG. 4A) is utilized. For the matching edge, the appropriate flat location 21, 22 or 23 on the larger diameter side of stop 19 is utilized to displace the cuts the required amount, $\frac{1}{2}$B.

THICK SECTIONS—FIG. 8C

Figure 8C:
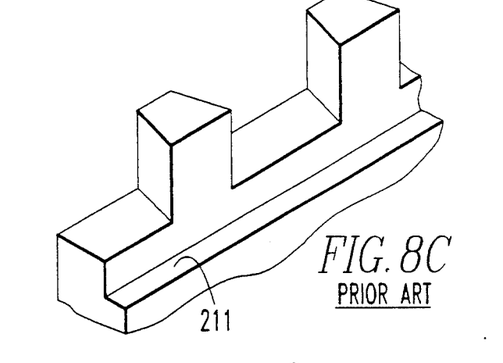
Figure 8D:
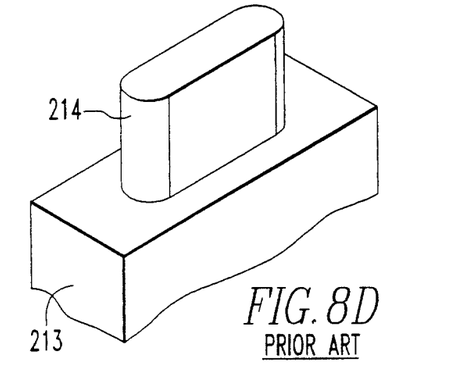

The thru dovetail and box joints described above are based on applications where the thickness of the wood is less than the useable cutting length of the router bit. Because of physical limitations in designing the router and bits the maximum cutting length of standard bits ranges from $\frac{3}{4}''$ to 1" depending on the bit Occasionally it becomes necessary to cut either of these thru joints in a member (s) which have a thickness greater than the cutting length of the bit. An illustration of the pin section of such a procedure is shown in FIG. 8C.

In order to complete either of these joints the edges of the boards have to be rabbited as shown by the reference character 211 such that the remaining thickness is less than the cutting length of the bit. The depth of this rabbit must be equal to or very slightly greater than the thickness of the member. This can be accomplished in a variety of ways depending on the power equipment available.

With the thickness reduced on each edge the procedure to cut either the thru dovetail or the box joint is the same as described above. The only exception is the final cutting of the sloping faces of the thru dovetail pins with a straight bit. The reduced thickness of the board now has moved the pins away from the face of the positioner 1. It is necessary therefore to compensate for this by moving the left and right pin templates 121, and 122 outward away from their normal position. This accomplished with templates 21 and 122 which are provided with slots 28 to permit shifting of the templates within the cutout to the proper position.

FORMING MORTICE AND TENON JOINTS—FIG. 8D

The tenons 214 are completed on the end of the board with a straight router bit utilizing template 123 (FIG. 5G). FIG. 8D shows a single completed tenon 214 cut on the edge 213. The jointer 10 is clamped to the end of the board in the usual manner with the stop 19 in the appropriate location. The template 123 is adjusted such that the indicated alignment marks on the template coincide with the centerline of the board, and it is then fastened in place. The router is guided along the edge of the template and into the available desired slots. This then completes one side of the tenon and the through slotting. The board 213 is then turned 180 degrees such that the opposite face is now against the positioner 1. The jointer 10 is then aligned with the stop 19 and the template such that the template is centered above the corresponding tenons. The jointer 10 is clamped in place and the router is guided along the edge of the template as above to complete the tenons. The template is in the proper position within the support base assembly 102 and does not have to be repositioned.

The mortices can be cut with a straight bit but generally with a spiral end mill bit which removes the material somewhat more efficiently. The depth of the mortice should be slightly greater than the height of the tenons to allow for proper fit and glue accumulation.

The mortice locations must be aligned with the tenon locations and this is accomplished by using the same locations for stop 19 in positioner 1 locations as when cutting the tenons. To cut the mortices into the end edge of the board the jointer is assembled to the board as with the tenons.

The morticing template. 124 is installed in the jointer and the centerline of the board is aligned with the centerline of the morticing groove and fastened in place. Where slots were cut in the tenon, the screws are inserted across the slot thereby separating it into a series of slots. The router bit must be first guided down into the member and then traverse the slot. This can be accomplished in several ways one of which includes first drilling a pilot hole(s) into the wood so that the bit can be inserted and then traversing the length of the slot(s).

The above procedure would join the edges of the two boards, and the two faces would be in the same plane. In order to join the two members perpendicular to each other the mortices must be cut into the face of the board and thru or into the thickness of the member.

In this procedure the face of the board would be clamped to the support base assembly 102 instead of to the positioner 1. The centerline of the mortice would be drawn on the face and aligned as before. The lateral position of the jointer 10 is set with the base stop 18 of FIG. 3B being at a location provided on the bottom surface of the support base assembly 102. The mortices would be cut in a similar manner.

FORMING HALF BLIND DOVETAILS

While there is no figure provided herein to illustrate the half blind dovetail joint, this joint is commonly used for smaller, thinner sections such as a drawer and is made using only the dovetail bit. There are a number of jigs made solely for this purpose. They are bench mounted and the matching members are both mounted in the jig. Both halves of the joint are in fact made in the same operation. When assembled one section appears uncut from a front view and the other shows a regular and uniform dovetail pattern.

In establishing the uniform spacing the design is based on utilizing a specific router bit and requires that the bit be set to a specific height. In order to insure a good fit, there is a certain amount of trial and error to achieve good fitting pin dimensions. The reason is that the pin width is established by the back side of successive cuts which can only be achieved by changing the depth of cut.

For large sections it is necessary to fasten the jointer to the two sections one on the edge and the other on the face and cut these separately. The pattern of the dovetail configuration is established by the matching template(s) configuration. Templates 125 and 126 for such a joint are shown in FIGS. 5I and 5J, which will permit the fabrication of matching joints within the cutting length of the template. For deeper sections, the fixture may be relocated using the stop 19 in the appropriate location.

FORMING IN-PLANE DOVETAIL JOINTS—FIG. 8F

Figure 8E:
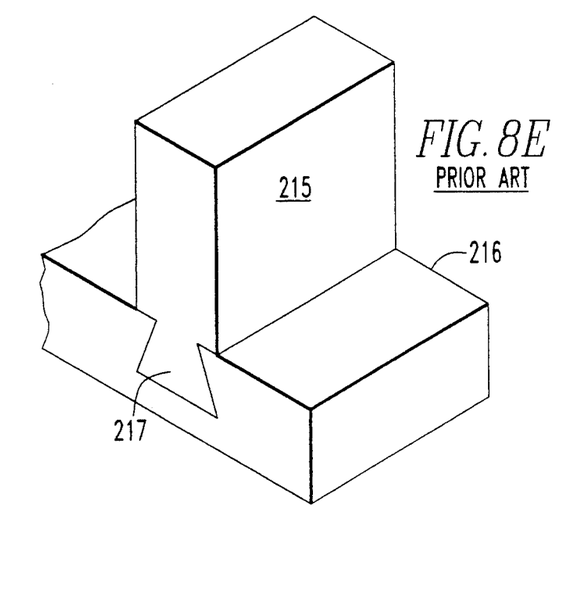
Figure 8F:
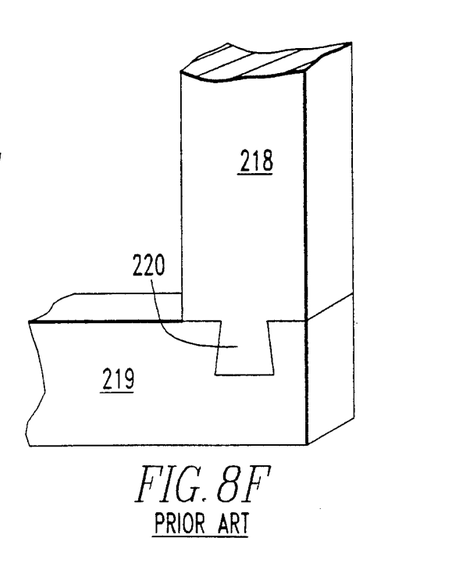

This joint is shown in FIG. 8F and is utilized often as a means to finish facing on a cabinet. In this case the dovetail shape 220 is cut by cutting thru the board 219 with the dovetail bit. This can be accomplished using template 117 and aligning the centerline of the template cutting slot with the desired centerline of the location selected. The jointer 10 would be clamped to the board 219 with the positioner 1 against the face and the upper edge of board 219 flush against the bottom of the support base member 102. The stop 18 mounted on member 102 may or may not be used.

The matching piece cut on the end of the other board 218 is the remaining tail such that the maximum width of the tail corresponds to maximum diameter of the dovetail bit. The sides are the remaining left and right sides of two separate operations. Knowing the depth of cut the centerline of these two operations can be determined and can be cut utilizing the appropriate positioner stop location 4 or 5 in row A or B. Some trial and error may be required by varying the depth of cut.

FORMING SLIDING/DOVETAIL JOINTS—FIG. 8E

In this joint the members 215 and 216 are perpendicular to each other and only the dovetail bit is used. The dovetail shape 217 is cut part way into the face of the board 216 and the matching tail 217 is cut along the edge of the matching board 215.

To cut this dovetail shape the jointer 10 is mounted with the support base member 102 located on the edge of the positioner 1 in the usual manner and fastened to it. The tenon template 123 (FIG. 5G) is inserted backwards in the slot cutout 12; that is, with the straight edge to be used for guidance. The centerline is drawn on the edge of the board and the lateral position of the template is adjusted such that when the bit traverses the length of the board the distance from the centerline to the cut edge is equal to ½ the maximum diameter of the bit. First one edge is cut and the board turned 180 degrees and similarly the opposite face is cut completing the operations on this piece.

The dovetail groove in the matching piece is not cut with the jointer. Knowing the centerline of the groove, temporary guides can be positioned on either side of the centerline and the router base used as the means of guidance. The depth of cut must in this case be equal to or slightly less than the depth of cut on the corresponding member.

I claim:

1. A jointer for accommodating the cutting of a workpiece with a router comprising:
   a positioner member having two generally planar parallel faces and adapted to be mounted vertically when employed with a router, said positioner member having a horizontal upper edge and two generally vertical side edges and having a cutout extending inwardly from said upper edge and having sides thereof spaced from the side edges, respectively;
   a generally planar support base member mounted on said upper edge and extending perpendicularly to said positioner member and outwardly from each of said parallel faces thereof, said support member being secured to said positioner member so that when said positioner member is mounted vertically, said support base member extends generally horizontally;
   said support base member having an inner cutout therein positioned in alignment with said cutout in said positioner member, means for mounting a removable router template on said support base member so that said template extends across at least a portion of said cutout in said support base member, and
   one of said support base member and said positioner member having indexing means thereon for precisely referencing an end of a workpiece relative to said template when said workpiece is secured to said jointer.

2. The jointer of claim 1 wherein said positioner member has a plurality of spaced mounting holed formed therein and located adjacent said upper edge and two of said mounting holes positioned between said side edges and the adjacent side of said cutout in said positioning member, respectively, said support base member having a portion extending downwardly from the side thereof which faces the upper edge of said positioner member and overlying at least said two mounting holes, and said support base member portion having openings therein in alignment with said two mounting holes for receiving fastening means which pass though said mounting holes into said openings for securing said support base member to either face of said positioning member.

3. The jointer of claim 1 wherein said indexing means are formed on said positioner member comprising at least one row of aligned evenly spaced indexing openings with said row extending parallel to the upper edge, said row extending between one of said side edges and the adjacent side of said cutout in said positioner member, and said indexing means including a pin member passing through one of said indexing openings and projecting outwardly from the adjacent face of said positioner member.

4. The jointer of claim 3 wherein said indexing means comprises a plurality of essentially coextending parallel rows of aligned indexing openings with each row extending parallel to the upper edge of the positioner member and the indexing openings of one row having different spacings from the indexing openings in the other rows.

5. The jointer of claim 1 wherein the cutout in the support base member has two sides extending generally perpendicularly to the plane of said faces of said positioner member and includes a pair of ledges facing the upper surface of the support base member and extending along said two sides of the cutout, said ledges receiving a template thereon to position the latter in the cutout in the support base member, and fastening means for removably mounting such template on at least one of said ledges.

6. The jointer of claim 5 wherein said support base member cutout is elongated in the direction of the plane of said positioner member and is of a predetermined width such that said ledges extend along the width thereof, said template cotending with the length of said support base member cutout so that it overlies said ledges, said template being of a smaller width than the width of said last mentioned cutout.

7. The jointer of claim 6 wherein said template includes two spaced elongated slots therein overlying said ledges on said support base member for receiving said fastening means therethrough whereby said template may be moved in said cutout in the direction perpendicular to the plane of said positioner member.

* * * * *